Patented Sept. 6, 1949

2,481,160

UNITED STATES PATENT OFFICE 2,481,160

PRODUCTION OF HALOCYCLOALKANES

Louis Schmerling, Riverside, Ill., assignor to Universal Oil Products Company, Chicago, Ill., a corporation of Delaware No Drawing. Application November 28, 1947, Serial No. 788,669

22 Claims. (Cl. 260—648)

This application is a continuation-in-part of my co-pending application Serial No. 496,617 filed July 29, 1943 and co-pending application Serial No. 496,951 filed July 31, 1943, both now abandoned.

This invention relates to the production of a halocycloalkane. More particularly the process relates to the addition of a monohalocycloparaffin to an unsaturated compound selected from the group consisting of a monoolefin and a halomonoolefin in the presence of a catalyst to produce a higher boiling halocycloparaffin with a molecular weight equal to the sum of molecular weights of the halocycloalkane and unsaturated compound charged to the process.

The process is concerned with a catalytic method of adding to or condensing with a monoolefin or halomonoolefin, a chloro-, bromo-, or iodocycloalkane and particularly a monochloro-, monobromo-, or monoiodocycloalkane.

In this specification, the term "condensing" is used in referring to the process of chemically combining a monohalocycloalkane with a monoolefinic compound selected from the group consisting of a monoolefin and a halomonoolefin preferably a monohalomonoolefin to form a halocycloalkane with higher boiling point and with a molecular weight equal to the sum of the molecular weights of the reacting halocycloalkane and unsaturated compound. The condensation reaction may also be regarded as an addition of the monohalocycloalkane to the olefinic compound. The condensation may include the reaction of the monohalocycloalkane with more than one molecular proportion of the monoolefin or haloolefin; that is, the product of condensation of one mole of each of the halocycloalkane and olefin or haloolefin may react with a second, third, etc. mole of the unsaturated compound to form a halocycloalkane of higher molecular weight.

An object of this invention is to provide a process for manufacturing a halocycloalkane.

Another object of this invention is to provide a process for condensing in the presence of a Friedel-Crafts catalyst a monohalocycloalkane and a monoolefin.

A further object of this invention is to provide a process for condensing a monoolefin and a monohalocycloalkane each containing a halogen atom with an atomic weight of from about 35 to about 80 in the presence of a metal halide catalyst.

One specific embodiment of this invention relates to a process for producing a higher boiling halocycloalkane which comprises chemically combining in the presence of a Friedel-Crafts metal halide catalyst a monohalocycloalkane and a monoolefinic compound selected from the members of the group consisting of a monoolefin and a halomonoolefin.

Another embodiment of this invention relates to a process for producing a higher boiling chlorocycloalkane which comprises chemically combining in the presence of a Friedel-Crafts catalyst, a monochlorocycloalkane and a monoolefinic compound selected from the members of the group consisting of a monoolefin and a halomonoolefin.

Halocycloalkanes which may also be referred to as halocycloparaffins and as halonaphthenes include halocyclopentanes, halocyclohexanes, halodecalins and other halogenated saturated cyclic compounds. The halogenated naphthenes and particularly the chloronaphthenes may be obtained from any suitable source. More specific examples of suitable halonaphthenes include tertiary monohalocycloalkanes such as 1-chloro-1-methylcyclopentane, 1-chloro-1-methylcyclohexane, 1-chloro-1-ethylcyclohexane, and 9-chlorodecahydronaphthalene and secondary monohalocycloalkanes as chlorocycloalkane and bromocycloalkane. The first two compounds may be prepared from the corresponding alcohols which may be synthesized by reaction of methylmagnesium chloride on cyclopentanone and cyclohexanone, respectively. The abovementioned chlorodecalin may be obtained by the addition of hydrogen chloride to 9,10-octalin.

Another method for making tertiary halocycloparaffins consists in adding a hydrogen halide to the double bond of a cyclo-olefin in which one of the hydrogen atoms attached to the double bonded carbon atoms is substituted by an alkyl group. For example, the addition of hydrogen chloride to 1-methylcyclohexene-1 produces 1-chloro-1-methylcyclohexane.

Secondary halocycloparaffins may be prepared either from the appropriate alcohol or by the addition of hydrogen halide to the appropriate cycloolefin.

Halocycloparaffins which I prefer to employ in the present process comprise particularly the chloro and bromocycloparaffins which sometimes are also herein referred to as monochloro and monobromocycloalkanes. These halocycloalkanes thus contain only one halogen atom having an atomic weight between 35 and 80 and a cycloparaffin ring, or a cycloparaffin ring with at least one attached alkyl group. Fluorocycloalkanes and iodocycloalkanes are also utilizable in this process.

Olefinic hydrocarbons utilizable in the present process include olefins and cycloolefins. Monoolefins may be either normally gaseous or normally liquid and comprise ethylene, propylene, butylenes, and also normally liquid olefins, the latter including various polymers of normally gaseous olefinic hydrocarbons. Aliphatic monoolefinic hydrocarbons which are utilizable in the present process may be obtained from any source and particularly from the products formed by catalytic and thermal cracking of oils, by dehydrogenation of paraffinic hydrocarbons, or by dehydrating alcohols.

Cycloolefinic hydrocarbons utilizable in the present process comprise cyclic hydrocarbons of the general formula $C_nH_{2n-2}$ in which $n$ represents an integer which is preferably at least 5. Cycloolefins containing five and six carbon atoms in the ring are preferred; that is, cyclopentene, alkyl cyclopentenes, cyclohexene, and alkyl cyclohexenes are the cycloolefins which I prefer to react with a halocycloparaffin. Thus a chlorocycloparaffin and a cycloolefin condense to form a chlorinated dicycloparaffin. Cyclopropene, cyclobutene, and alkylcyclobutenes are generally more difficult to obtain than the cycloolefins containing rings of 5 or 6 carbon atoms per molecule and accordingly are used less frequently in the present process.

Haloolefins which are condensed with saturated halides as herein set forth contain one double bond per molecule and at least one halogen atom, and comprise haloethenes, -propenes, -butenes, -pentenes, -hexenes, -heptenes, and higher molecular weight haloalkenes. Vinyl chloride, vinyl bromide, allyl chloride, allyl bromide, propenyl chloride, isopropenyl chloride, isocrotyl chloride, and methallyl chloride are representative of suitable haloolefins containing one halogen atom and one double bond per molecule and utilizable in the present process. Polyhalomonoolefins include such compounds as cis-dichloroethylene, 1,3-dichloropropene, trichloroethylenes, etc. The term "haloolefins" is used herein in reference to the above-mentioned unsaturated halogen compounds as well as to other unsaturated compounds such as halocycloolefins containing at least one halogen atom per molecule and a cycloolefin ring. The haloolefins preferred for use in this process contain chlorine or bromine but those containing fluorine or iodine are also suitable for condensation with a monohalocycloalkane.

Monohaloolefins may be formed in any suitable manner such as by the action of a halogen upon an olefin at a temperature at which substitution occurs and substantially in excess of that at which the principal reaction is addition of halogen to the olefinic double bond. Monohaloolefins may also be prepared by the addition of halogen to an olefinic double bond to form a dihaloalkane from which one molecule of hydrogen halide may be removed by any of several well-known methods to produce a monohaloolefin. Furthermore, haloolefins may be prepared by addition of hydrogen halide to acetylenes.

Halocycloolefins which may be employed in the present process include particularly monohalocyclopentenes and monohalocyclohexenes. These halogenated compounds may be prepared by adding a halogen to a cycloolefin to form a dihalocycloparaffin and then eliminating one molecule of hydrogen halide from said dihalocycloparaffin. Monohalocycloolefins may also be prepared by splitting out the elements of water from a halohydrin as well as by other methods. Examples of suitable monohalocycloolefins include 1-chloro-1-cyclohexene, 1-chloro-3-cyclohexene, 1-chloro-1-cyclopentene, 1-chloro-2-methyl-2-cyclopentene, etc.

Catalysts which are suitable for promoting the process of this invention comprise Friedel-Crafts metal halides including particularly ferric chloride, bismuth chloride, and zirconium chloride, zinc chloride, and the more reactive metal halides such as aluminum chloride and aluminum bromide.

These different catalytic materials containing metal halides of the Friedel-Crafts type may be employed as such; they may be dissolved in a suitable solvent such at nitromethane, nitrobenzene, carbon disulfide, etc. Also complexes of Friedel-Crafts catalysts with organic compounds, and used catalyst sludges may be employed or the Friedel-Crafts halides may be composited with one another or supported on solid carriers or spacing materials to produce catalyst composites of desired activities. Suitable catalyst carriers or supports include both adsorptive and substantially non-adsorptive materials, for example, alumina, activated clay, charcoal, crushed porcelain, raw and acid treated clays, diatomaceous earth, pumice, fire brick, etc. The carriers should be substantially inert in the sense that substantially no interaction which is detrimental to the activity or selectivity of the catalyst composite occurs between the carrier and the metal halide.

In this process condensation of a monohalocycloalkane and a monoolefinic compound selected from the group consisting of a monoolefin and a halomonoolefin is somewhat analogous to the addition of a hydrogen halide to the double bond of an olefinic hydrocarbon. That is, the halocycloalkane apparently adds to the double bond of the unsaturated compound in this case producing a halocycloalkane of higher molecular weight containing one or more than one halogen atom.

For example, the condensation of 1-chloro-1-methylcyclohexane and propylene in the presence of bismuth chloride, which is a Friedel-Crafts catalyst, yields a chloropropyl-methylcyclohexane believed to be 1-(β-chloropropyl)-1-methylcyclohexane as illustrated by the following equation:

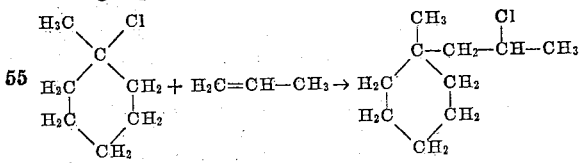

Other halonaphthenes or halocycloparaffins undergo similar condensations with cycloolefins producing halogenated bicyclic hydrocarbons.

Similarly, the condensation of 1-chloro-1-methyl-cyclopentane and vinyl chloride in the presence of bismuth chloride yields dichloroethyl-methylcyclopentane or an isomer thereof as illustrated by the following equation:

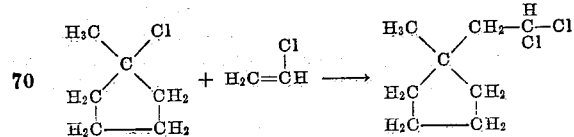

Other halonaphthenes or halocycloparaffins also undergo condensation with halocycloolefins producing halogenated bicyclic hydrocarbons.

Thus the reaction of a 1-chloro-1-methylcyclohexane with 1-chloro-1-cyclopentene occurs as follows:

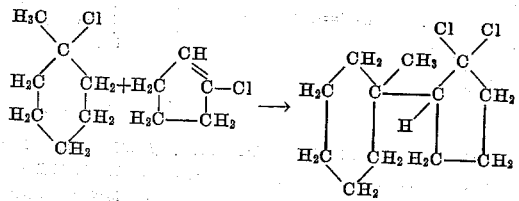

In some cases, as for example in the reaction of a halocyclohexane with ethylene, the primary product may react with a second molecule of ethylene thus yielding as the major product, a product having a molecular weight equal to the sum of the molecular weight of the halonaphthene plus twice the molecular weight of the olefin. Thus, the reaction of bromocyclohexane with ethylene in the presence of aluminum chloride yields 1 - (β-bromoethyl) - 1 - ethyl-cyclohexane.

Previous to my work, no condensation of a monohalocycloalkane with a monoolefin or halo-monoolefin in the presence of a Friedel-Crafts halide catalyst has been reported. It was known, however, that a polyhaloalkane on which at least two halogen atoms (usually chlorine) are attached to the same primary (terminal) carbon atom could be condensed with a haloolefin. This reaction is now very well-known and is often referred to as the Prins reaction. The history of the Prins reaction is both interesting and significant. Prins published his first paper on the condensation reaction in 1910 (Boeseken and Prins, K. Akad. Wetenschappen, 19, 776 (1910); C. A., 5, 2843 (1911)). It was shown that chloroform and carbon tetrachloride could be condensed with di-, tri-, and tetra-chloroethylene in the presence of aluminum chloride as catalyst. Prins received German Patent 261,689 in 1913 and published additional papers on the subject in 1914 (J. Prakt. Chem., 89, 414 and 425 (1914)). In 1932 Prins renewed his interest in the reaction and made a very extensive study thereof. These papers were published in Rec. Trav. Chim. 51, 1065 (1932); 54, 249 (1935); 56, 119 and 779 (1937); 57, 659 (1938). In none of these did he show that the condensation of a saturated monohalide (as a monohalocycloalkane) with an olefin or a haloolefin is possible. On the contrary, he even stated that such a reaction is not possible and gave theoretical reasons to show why it is not possible. In the meantime, other workers became interested in the Prins reaction and even obtained patent coverage on particular condensations. Thus, the Kirkbride Patent 2,298,564 is concerned with the condensation of carbon tetrachloride with dichloroethylene, the very condensation which Prins studied in 1910. Kirkbride's process differs from the reaction which was carried out more than 25 years earlier only in the fact that a higher temperature was used (i. e., above 45° C. instead of at about 20° C.; Prins, however, did use temperatures above 45° C. with chloroform) which resulted in the formation of a chlorinated pentane instead of a chlorinated propane.

Similarly, Sixt received Patent 2,068,772 relating to the condensation of 1,1-di-chloroethane with a chloroethylene, presumably because Prins was unable to bring about the condensation with chloroethanes containing less than three chlorine atoms (Rec. Trav. Chim. 56, 119 (1937)).

Haloalkanes which were previously condensed with haloolefins are chloroform, carbon tetrachloride, 1,1,di-chloroethane and 1,2,2-trichloroethane.

From these earlier results, it was not possible to predict whether a monochlorocycloalkane could be condensed with a monoolefin or a halomonoolefin. Indeed, in view of the earlier results, it is unexpected that a monohalocycloalkane can be condensed with an olefin or haloolefin. If such a reaction is not unexpected, it is surprising that such a process was not claimed long ago in a patent or at least described in the chemical literature.

In carrying out his reaction, Prins found he could reflux chloroform and dichloroethylene separately with aluminum chloride for a few minutes and then combine the liquids and heat them at 50° C. for two hours with the resultant formation of pentachloropropane (Rec. Trav. Chim., 54, 307 (1935)). It is important to note that the chloroform did not react when heated with the catalyst. Indeed, all of the saturated halides previously used are substances which can be treated with aluminum chloride without obtaining reaction. If a monohalocycloalkane such as those used in the reactions of this process is contacted with aluminum chloride, (in the absence of the olefinic compounds of my process) at even room temperature, a very vigorous reaction occurs, hydrogen chloride is evolved and the resulting olefin polymerizes. In other words, there is a vast difference between the polyhaloalkanes used by Prins and the monohalocycloalkanes of the present process.

Another important difference between the process of this invention and the prior art is the fact that the present process can be carried out in the presence of many Friedel-Crafts catalysts which range in activities from such feebly active substances as mercuric chloride and moderately active substances as bismuth chloride to very active catalysts such as ferric chloride and aluminum chloride, whereas the prior art showed that only aluminum chloride could be used as catalyst, for the condensation of a polyhaloalkane with a haloolefin, Prins having shown that not even so active a metal halide as ferric chloride will catalyze his reaction. Accordingly, there is a marked difference in the chemical behavior of the monohalocycloalkanes of this process and the polyhaloalkanes of the prior art.

Furthermore, Prins himself did not believe that the reaction of the present process could be effected; in 1932 he stated: "Alkyl halides (namely monohalides) require a much stronger activation and react only when the molecule is polarized or activated by the presence of a plurality of chlorine atoms. The difference in the ability of alkyl halides to react with benzene (as opposed to monoolefins or halomonoolefins) must be explained on the basis that substitution in the benzene ring is not an addition to a double bond."

Prins, then, believed that saturated monohalides could not be added to the ethylenic double bond. It is also pertinent that he found that even chloroform could not be added to ethylene. Thus Prins stated "When ethylene is led into a solution of aluminum chloride in chloroform or dichloromethane there is formed, according to my experiments, only a trace of polymer whereas, as I have already shown, neither chloroform nor hexachloropropane added to ethylene." If, then, chloroform which reacts so readily with all the chloroethylenes does not react with the ethylene itself, there is certainly no basis for predicting that any other saturated chloride, as a monochlorocycloalkane, will react with ethylene and even less basis for expecting that a monohalide will react. Accordingly, since chloroform which reacts so readily with all the chloroethylenes does not react with ethylene itself, it is not predictable that any other saturated halide such as a monohalocycloalkane will react with an olefin. When a monochlorocycloalkane reacts with a monoolefin or halomonoolefin, an unexpected result is obtained.

The mechanism of the condensation of an olefin with a chlorocycloparaffin is entirely different from that of the condensation of an olefin with a cycloparaffin. Thus the reaction of propylene with methylcyclohexane yielded methylisopropylcyclohexane. From this result the alkylation of the cyclohexane ring might be expected upon reacting propylene with 1-methyl-1-chlorocyclohexane, as illustrated by the equation:

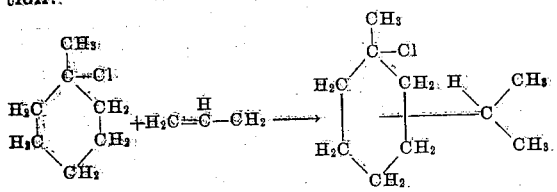

However, the reaction of 1-methyl-1-chlorocyclohexane with propylene involves addition of the former to the double bond of the latter forming 1-(β-chloropropyl)-1-methylcyclohexane according to the equation:

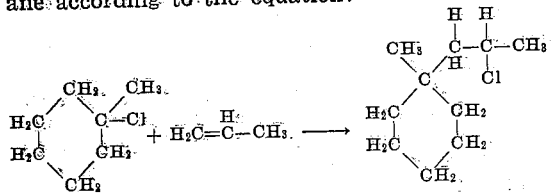

From the above equations it is apparent that the chlorine atom is involved in the addition reaction instead of a nuclear hydrogen atom, when reacting a monochlorocycloalkane with an olefin as ethylene or propylene.

By my process, it is also possible to condense secondary chlorocycloalkanes with monoolefins and halomonoolefins. Thus the interaction of chlorocyclohexane with ethylene in the presence of aluminum chloride gave 10% of 1-(β-chloroethyl)-1-ethyl-cyclohexane and the analogous bromine compound was obtained from bromocyclohexane and ethylene in 32% yield. These results are analogous to those obtained with tertiary chlorocycloalkanes such as 1-chloro-1-methylcyclohexane. These reactions are illustrated by the following equations:

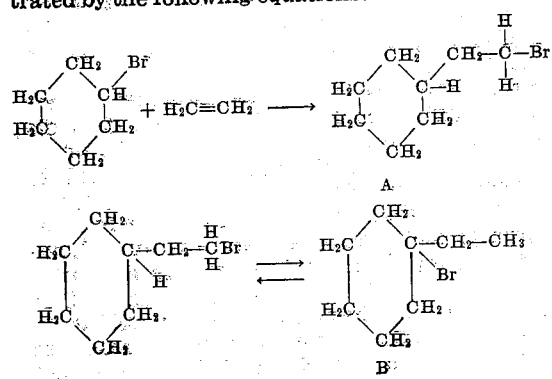

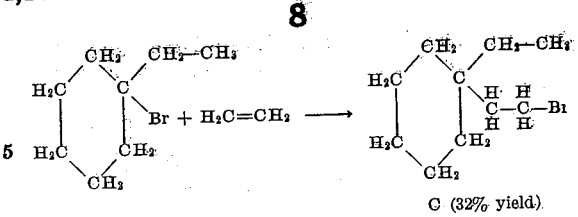

C (32% yield)

Product A is obtained in small yield, only because it isomerizes readily to compound B which is a tertiary halide and is more active than either A or the original chlorocyclohexane and adds more ethylene to give C in good yield.

The utility of this reaction is shown by the fact that compound C may be converted by hydrogenation into 1,1-diethylcyclohexane which can be prepared by other means only with extreme difficulty.

The production of halocycloalkanes by my process is carried out by reacting a halocycloalkane, and preferably a monohalocycloalkane, with a monoolefin or halomonoolefin in the presence of a Friedel-Crafts metal halide catalyst at a temperature of from about $-30°$ to about $100°$ C. The operating temperature preferred in order to obtain high yields of halocycloalkane condensation products is dependent upon the particular catalyst and also upon the reactants. Careful temperature regulation within the indicated range is essential only insofar as the formation of the desired high yields is concerned.

When ferric chloride or aluminum chloride is chosen as the catalyst, the operating temperatures are from about $-30°$ to about $50°$ C. but preferred temperatures are from $-10°$ to $+25°$ C. If the reaction is carried out at high temperatures in the range of about $-30°$ to about $100°$ C., the yields of halocycloalkane condensation products may be low but at least some condensation product will be obtained. As will be evident from later examples, there was no careful temperature control in the experiment of Example IV in which the temperature increased gradually from $-15°$ to $+20°$ C., nor was there definite control of temperature in the experiment of Example VII in which the reaction was so vigorous that the temperature of the reaction mixture was increased to about $35°$ C. The condensation of Example VII could also be carried out by bubbling vinyl chloride slowly through a well-stirred mixture of chlorocyclohexane and aluminum chloride at any temperature between about $-20°$ and $+30°$ C. or even $+50°$ C. or higher. The yield of dichlorocyclohexylethane so obtained would be dependent upon the particular temperature used in the reaction. In general good yields of condensation products are obtained in this process at temperatures in the mentioned range and below about $50°$ C.

The condensation of a monohalocycloalkane and an olefinic compound selected from the members of the group consisting of a monoolefin and a halomonoolefin in the presence of a catalyst as herein described may be carried out using either batch or continuous types of operation. It may also be desirable to introduce with one or more of the reactants a hydrogen halide such as hydrogen chloride or hydrogen bromide. Sometimes the introduction of hydrogen to the reaction mixture may have a beneficial effect upon the reaction.

In batch type operation, desired proportions of halocycloalkanes and monoolefin or halomonoolefin or mixtures containing these unsaturated compounds are introduced to a reactor containing the Friedel-Crafts catalyst; and the resultant commingled material is contacted until a substantial proportion of said reactants are converted into the desired halocycloalkane condensation product. The reaction mixture after separation from the catalyst is fractionally distilled or otherwise treated to separate unconverted halocycloalkane and unconverted olefinic compound from the higher boiling reaction products. The recovered unconverted material and used catalyst may be used in another run to produce an additional quantity of the desired condensation product.

Continuous operation may be carried out by directing a halocycloalkane and an olefin or haloolefin through a reactor of suitable design containing catalyst or to which the catalyst is introduced continuously during the reaction. The catalyst may comprise a stationary bed of a granular composite containing a Friedel-Crafts metal halide. In this type of treatment the operating conditions may be identical or they may differ somewhat from those employed in batch type operation. Thus when a mixture of halocycloalkane and a monoolefin or a halomonoolefin is passed through a reactor containing a catalyst, for example, ferric chloride supported by granular porcelain, the formation of the desired halocycloalkane may be effected by using a higher temperature and shorter time of treatment than those required for effecting similar conversion by contacting a similar reaction mixture and catalyst at a lower temperature in a batch type reactor such as an autoclave provided with a suitable stirring means. Used catalyst recovered from the process may be fortified by addition of fresh catalyst and may be returned to the condensation process for further use.

In some cases, it is advisable to commingle the charged halocycloalkane and unsaturated compound with a solvent such as a petroleum naphtha, for example, normal pentane, or a nitroparaffin, for example, nitromethane and then to effect the condensation in the presence of this added solvent. Obviously, the solvent chosen should be one which does not itself undergo undesirable reactions at the operating conditions employed.

Different halocycloalkanes produced by the present process may be used for various purposes. Such resultant monohalocycloalkanes may be utilized as solvents, they may be employed as intermediates in the synthesis of various organic compounds and for other purposes.

Polyhalocycloalkanes formed by this process are also valuable intermediates for the preparation of other useful compounds. The halocycloalkanes having two halogen atoms attached to a terminal carbon atom may be readily hydrolyzed to form aldehydes with the same carbon structure by heating with water. Similarly, hydrolysis of dihalocycloalkanes in which two halogen atoms are attached to a non-terminal carbon atom yield ketones. The mentioned carbonyl compounds which may thus be produced from a di-halocycloalkane are useful as solvents or in the production of certain synthetic resins and other products. The monohalocycloalkanes formed by this process may be converted to alcohols or olefins by hydrolysis or dehydrogenation, respectively.

The following examples are given to illustrate the character of results obtained in specific embodiments of this invention, although the data given are not introduced with the intention of restricting unduly the generally broad scope of the invention.

*Example I*

23 grams of 1-chloro-1-methylcyclohexane boiling from 148° to 158° C., 10 grams of propylene, and 4 grams of bismuth chloride were sealed in an autoclave which was rotated at 20 C. for four hours. The reaction product was then removed from the autoclave and separated into 26 grams of colorless liquid product and 4.5 grams of a brown catalyst layer. Distillation of the liquid product yielded (besides unreacted chloromethylcyclohexane) 4 grams of a substance boiling at 212-215° C. and having a refractive index, $n_D^{20}$, of 1.4700. These properties of this substance are those expected for a chloropropylmethylcyclohexane. It is believed that the substance which boiled at 212°-215° C. was 1-($\beta$-chloropropyl)-1-methylcyclohexane.

*Example II*

15 grams of 1-chloro-1-methylcyclohexane and 3 grams of anhydrous ferric chloride were placed in a glass-lined steel autoclave to which ethylene was introduced to 30 atmospheres pressure. The charged autoclave was then rotated for four hours at 25° C. The resultant reaction product contained a 10% yield of 1-($\beta$-chloro-ethyl)-1-methylcyclohexane.

*Example III*

A glass liner for a rotatable steel autoclave was cooled to −78° C. and charged with a mixture of 19.5 grams of 1-chloro-1-methylcyclopentane, 11.5 grams of propylene, and 2 grams of substantially anhydrous ferric chloride. The glass liner was then sealed into a rotatable steel autoclave to which nitrogen was added to 50 atmospheres pressure. The autoclave and contents were then rotated at 25° C. for four hours and then permitted to stand for about 15 hours at the same temperature. The reaction products were then removed from the autoclave and separated into 29 grams of dark brown liquid and a powdered black catalyst. Fractional distillation of the liquid yielded 6 grams of chloropropylmethylcyclopentane boiling at 55° to 57° C. under a pressure of 5 mm. of mercury and having a refractive index of 1.4634 at 20° C. This chloropropylmethylcyclopentane which had a normal boiling point of 188°-190° C. appeared to be 1-($\beta$-chloropropyl)-1-methylcyclopentane.

*Example IV*

A mixture of 33 grams of 1-chloro-1-methylcyclohexane and 16 grams of vinyl chloride in a cylindrical glass reactor was cooled to −15° C. and 1 gram of anhydrous aluminum chloride was then added to the mixture after which the temperature increased gradually to +20° C. over a period of 15 minutes during which the reactants were contacted with the catalyst. From the resultant reaction mixture there was obtained 20% of the theoretical yield of 1-($\beta,\beta$-dichloroethyl)-1-methylcyclohexane with a boiling point of 100–102° C. at a pressure of 12 mm. of mercury, an index of refraction, $n_D^{20}$, of 1.4858, and a density of 1.07 at 20° C.

*Example V*

In another run similar to that of Example IV a mixture of 16 grams of 1-chloro-1-methylcyclopentane and 9.5 grams of vinyl chloride was cooled to −78° C. in a glass cylinder and 1 gram of anhydrous aluminum chloride was added to the cooled reaction mixture which was shaken intermittently at a temperature of from −10° to +5° C. for 7 minutes. At the end of this reaction time the upper layer of reaction product was decanted from the catalyst and distilled to give 20% of the theoretical yield of 1-(β,β-chloroethyl)-1-methylcyclopentane which boiled between 84° and 87° C. at a pressure of 11 mm. of mercury, had a refractive index, $n_D^{20}$, of 1.4780, and a density of 1.08 at 20° C.

Example VI

A mixture of 50 grams of chlorocyclohexane and 25 grams of vinyl chloride contained in a cylindrical glass reactor was cooled to −78° C. and 5 grams of anhydrous ferric chloride was added thereto. The glass reactor was then sealed in a rotatable steel autoclave, nitrogen was introduced thereto to 50 atmospheres pressure and the charged autoclave was rotated at 25° C. for four hours. The autoclave was then permitted to stand for 16 hours at room temperature after which the products were removed therefrom consisting of 74 grams of a mixture of brown liquid and black catalyst sludge and 2.5 grams of condensible gas. After being separated from the catalyst, washed, and distilled, the liquid product yielded 5.2 cc. of 1,1-dichloro-2-cyclohexylethane which boiled at 205° to 214° C. at 760 mm. pressure and had a refractive index of 1.4810 at 20° C. The amount of 1,1-dichloro-2-cyclohexylethane so obtained was equivalent to about 7% of the theoretical yield based upon the quantity of chlorocyclohexane charged to the reaction.

Example VII

A cylindrical glass reactor charged with 120 grams of chlorocyclohexane and 58 grams of vinyl chloride was cooled to −70° C. Then 5 grams of anhydrous aluminum chloride was added to the cooled mixture of chlorocyclohexane and vinyl chloride and the mixture, which was shaken intermittently, increased in temperature from −70° to −12° C. during 7 minutes. The reaction was so vigorous that even though the glass reactor was immersed in a cooling bath at −78° C., the temperature of the reaction mixture increased to about +35° C. during ½ minute. The reaction mixture was then maintained at 30° C. for 4.5 minutes and then cooled to 0° C. during the next 1.5 minutes. After a total reaction time of 11 minutes, the reaction mixture was cooled to −40° C. and at that temperature 165 grams of liquid products were decanted from 8 grams of catalyst layer. The upper layer of the reaction product after washing and distilling yielded 60 grams of 1,1-dichloro-2-cyclohexylethane which boiled at 87° to 88° C. at 9 mm. pressure (boiling point calculated at 214° C. at 760 mm.) and had a refractive index, $n_D^{20}$, of 1.4810. The 60 grams of 1,1-dichloro-2-cyclohexylethane represented about 35% of the theoretical yield based upon the quantity of chlorocyclohexane charged to the reaction.

Example VIII

Ethylene was bubbled through a stirred mixture of 3 grams of aluminum chloride and 31 grams of 1-chloro-1-methylcyclohexane dissolved in 41 grams of n-pentane diluent. The reaction temperature was −30° to −25° C. A total of 15 grams of ethylene was absorbed during one hour. The liquid upper layer was separated from the 8 grams of orange-colored catalyst sludge, washed, dried and distilled. There was obtained 16 grams (43% of the theoretical) of 1-(β-chloroethyl)-1-methylcyclohexane boiling at 62–66° at 3.5 mm. mercury pressure. The product had a refractive index, $n_D^{20}$, of 1.4699 and a density, $D_4^{20}$, of 0.9026. Its molecular refraction was 46.5; that calculated for $C_9H_{17}Cl$ is 46.4.

Example IX

Ethylene was condensed with chlorocyclohexane (50 grams charged) in the presence of 6 grams of aluminum chloride at −21 to −8° C. using the procedure described in Example VIII. There was obtained 8 grams (10%) of the theory of 1-(β-chloroethyl)-1-ethylcyclohexane, boiling at 77–78° at 3 mm. mercury pressure; its refractive index, $n_D^{20}$, was 1.4750.

Example X

The structure of the product obtained in Example IX was proved by showing that it was the same as that obtained by condensing 1-chloro-1-ethylcyclohexane (31 grams) with ethylene in the presence of aluminum chloride (3 grams) at about −10° to 0° C., using the procedure described in Example VIII.

Example XI

Condensation of bromocyclohexane (150 grams charged) with ethylene (84 grams absorbed) in the presence of 10 grams of aluminum chloride at −20° to −10° C. using the procedure of Example VIII yielded 65 grams (32%) yield of 1-(β-bromo-ethyl)-1-ethyl-cyclohexane, boiling at 86° C. at 3 mm. mercury pressure and having a refractive index, $n_D^{20}$, of 1.4945 and a density, $D_4^{20}$, of 1.1854. Its molecular refraction was 53.9 which is identical with that calculated for $C_{10}H_{19}Br$.

Reduction of the bromide by treatment with zinc and alcohol yielded 1,1-diethylcyclohexane, a new hydrocarbon, boiling at 173° C. at atmospheric pressure, $n_D^{20}$, 1.4500. This hydrocarbon can be prepared only with difficulty, if at all, by other methods, thus illustrating one of the useful results obtainable via the products of my invention.

I claim as my invention:

1. A process for producing a higher boiling halocycloalkane which comprises chemically combining in the presence of a Friedel-Crafts halide catalyst a monohalocycloalkane and a monoolefinic compound selected from the members of the group consisting of a monoolefin and a halomonoolefin.

2. A process for producing a higher boiling halocycloalkane which comprises chemically combining in the presence of a Friedel-Crafts metal halide catalyst a monochlorocycloalkane and a monoolefinic compound selected from the members of the group consisting of a monoolefin and a halomonoolefin.

3. A process which comprises reacting a monohalocycloalkane and a monoolefinic compound selected from the members of the group consisting of a monoolefin and a halomonoolefin at condensing conditions in the presence of a Friedel-Crafts metal halide catalyst to form a higher boiling halocycloalkane having a molecular weight equal to the sum of the molecular weights of the reactants, and recovering said higher boiling halocycloalkane.

4. A process which comprises reacting a monohalocycloalkane and a monoolefin at condensing conditions in the presence of a Friedel-Crafts metal halide catalyst to form a monohalocycloalkane having a molecular weight equal to the sum of the molecular weights of the reactants, and recovering said last named monohalocycloalkane.

5. A process which comprises reacting a monohalocycloalkane and a halomonoolefin at condensing conditions in the presence of a Friedel-Crafts metal halide catalyst to form a polyhalocycloalkane having a molecular weight equal to the sum of the molecular weights of the reactants, and recovering said polyhalocycloalkane.

6. A process which comprises reacting a monohalocycloalkane and a monoolefin at a temperature of from about −30° to about 100° C. in the presence of a Friedel-Crafts metal halide catalyst to form a higher boiling monohalocycloalkane having a molecular weight equal to the sum of the molecular weights of the reactants and recovering said higher boiling halocycloalkane.

7. A process which comprises reacting a monohalocycloalkane and a halomonoolefin at a temperature of from about −30° to about 100° C. in the presence of a Friedel-Crafts metal halide catalyst to form a polyhalocycloalkane having a molecular weight equal to the sum of the molecular weights of the reactants, and recovering said polyhalocycloalkane.

8. A process which comprises reacting a monochlorocycloalkane and a monoolefin at a temperature of from about −30° to about 100° C. in the presence of a Friedel-Crafts metal halide catalyst to form a higher boiling monochlorocycloalkane having a molecular weight equal to the sum of the molecular weights of the reactants, and recovering said higher boiling monochlorocycloalkane.

9. A process which comprises reacting a monobromocycloalkane and a monoolefin at a temperature of from about −30° to about 100° C. in the presence of a Friedel-Crafts metal halide catalyst to form a higher boiling monobromocycloalkane having a molecular weight equal to the sum of the molecular weights of the reactants, and recovering said higher boiling monobromocycloalkane.

10. A process which comprises reacting a monochlorocycloalkane and a monochloroolefin at a temperature of from about −30° to about 100° C. in the presence of a Friedel-Crafts metal halide catalyst to form a dichlorocycloalkane having a molecular weight equal to the sum of the molecular weights of the reactants, and recovering said dichlorocycloalkane.

11. A process which comprises reacting a monobromocycloalkane and a monobromoolefin at a temperature of from about −30° to about 100° C. in the presence of a Friedel-Crafts metal halide catalyst to form a dibromocycloalkane having a molecular weight equal to the sum of the molecular weights of the reactants, and recovering said dibromocycloalkane.

12. A process for producing a higher boiling halocycloalkane which comprises reacting a tertiary monohalocycloalkane and a monoolefinic compound selected from the members of the group consisting of a monoolefin and a halomonoolefin at a temperature of from about −30° to about 100° C. in the presence of a Friedel-Crafts metal halide catalyst, and recovering the resultant halocycloalkane.

13. A process for producing a higher boiling halocycloalkane which comprises reacting a secondary monohalocycloalkane and a monoolefinic compound selected from the members of the group consisting of a monoolefin and a halomonoolefin at a temperature of from about −30° to about 100° C. in the presence of a Friedel-Crafts metal halide catalyst, and recovering the resultant halocycloalkane.

14. The process defined in claim 12 further characterized in that chlorine is the halogen of said halocycloalkanes and halomonoolefin.

15. The process defined in claim 13 further characterized in that chlorine is the halogen of said halocycloalkanes and halomonoolefin.

16. A process for producing 1-($\beta$-chloroethyl)-1-methylcyclohexane which comprises reacting 1-chloro-1-methylcyclohexane and ethylene in the presence of a ferric chloride catalyst at a temperature of from about −30° to about 50° C., and recovering the resultant 1-($\beta$-chloroethyl)-1-methylcyclohexane.

17. A process for producing 1-($\beta$-chloropropyl)-1-methylcyclopentane which comprises reacting 1-chloro-1-methylcyclopentane and propylene in the presence of a ferric chloride catalyst at a temperature of from about −30° to about 50° C., and recovering the resultant 1-($\beta$-chloroproyl)-1-methylcyclopentane.

18. A process for producing 1-($\beta,\beta$-dichloroethyl)-1-methylcyclohexane which comprises reacting 1-chloro-1-methylcyclohexane and vinyl chloride in the presence of an aluminum chloride catalyst at a temperature of from about −30° to about 50° C., and recovering the resultant 1-($\beta,\beta$-dichloroethyl)-1-methylcyclohexane.

19. A process for producing 1-($\beta$-chloroethyl)-1-ethylcyclohexane which comprises reacting chlorocyclohexane and ethylene in the presence of an aluminum chloride catalyst at a temperature of from about −30° to about 50° C., and recovering the resultant 1-($\beta$-chloroethyl)-1-ethylcyclohexane.

20. A process for producing 1-($\beta$-bromoethyl)-1-ethylcyclohexane which comprises reacting bromocyclohexane and ethylene in the presence of an aluminum chloride catalyst at a temperature of from about −30° to about 50° C., and recovering the resultant 1-($\beta$-bromoethyl)-1-ethylcyclohexane.

21. A process which comprises reacting a tertiary monochlorocyclo-alkane with a chloromono-olefin in the presence of a Friedel-Crafts metal halide catalyst at a temperature of from about −20° C. to about +100° C. to form a polychlorocycloalkane having a molecular weight equal to the sum of the molecular weights of said monochlorocyclo-alkane and said chloromono-olefin, and recovering said polychlorocycloalkane from the resultant products.

22. A process which comprises reacting a tertiary monochlorocyclo-alkane with a monochloromono-olefin in the presence of a Friedel-Crafts metal halide catalyst at a temperature of from about −20° C. to about +50° C. to form a dichlorocyclo-alkane having a molecular weight equal to the sum of the molecular weights of said monochlorocyclo-alkane and said monochloromono-olefin, and recovering said dichlorocycloalkane from the resultant products.

LOUIS SCHMERLING.

REFERENCES CITED

The following references are of record in the file of this patent:

UNITED STATES PATENTS

| Number | Name | Date |
|---|---|---|
| 2,434,289 | Schmerling | Jan. 13, 1948 |